United States Patent
Kjellin et al.

(10) Patent No.: US 6,850,054 B2
(45) Date of Patent: Feb. 1, 2005

(54) DEVICE AND A METHOD FOR NON-CONTACTING SENSING OF THE ROTATIONAL STATE OF A ROTOR

(75) Inventors: Tord Kjellin, Stockholm (SE); Staffan Ralberg, Stockholm (SE)

(73) Assignee: Elster Messtechnik GmbH, Lampertheim (DE)

( * ) Notice: Subject to any disclaimer, the term of this patent is extended or adjusted under 35 U.S.C. 154(b) by 0 days.

(21) Appl. No.: 10/343,908

(22) PCT Filed: Jul. 2, 2001

(86) PCT No.: PCT/SE01/01519

§ 371 (c)(1),
(2), (4) Date: Jul. 25, 2003

(87) PCT Pub. No.: WO02/12836

PCT Pub. Date: Feb. 14, 2002

(65) Prior Publication Data

US 2004/0012384 A1 Jan. 22, 2004

(30) Foreign Application Priority Data

Aug. 9, 2000 (SE) .............................................. 0002853

(51) Int. Cl.[7] .............................. G01B 7/14; G01R 33/00
(52) U.S. Cl. .................. 324/207.11; 318/721; 318/723; 73/861.78
(58) Field of Search .................. 324/207.11, 207.15–17, 324/207.25, 609, 687, 633, 635; 318/721, 723; 73/861.78, 862.68

(56) References Cited

U.S. PATENT DOCUMENTS

| 5,187,989 A | | 2/1993 | Bulteau ..................... 73/861.78 |
| 6,388,405 B2 | * | 5/2002 | Laurent ....................... 318/254 |
| 6,734,666 B2 | * | 5/2004 | Voillat .................... 324/207.16 |

FOREIGN PATENT DOCUMENTS

| DE | 2943184 A1 | 5/1981 |
| DE | 3213602 A1 | 10/1983 |
| DE | 3318900 A1 | 11/1984 |
| DE | 3923398 C1 | 1/1991 |
| DE | 4137695 A1 | 5/1993 |
| DE | 4301966 C1 | 3/1994 |
| DE | 19725806 A1 | 1/1999 |
| DE | 19745236 A1 | 5/1999 |
| EP | 0370174 B1 | 5/1990 |
| EP | 0720021 B1 | 7/1996 |

* cited by examiner

Primary Examiner—Vincent Q. Nguyen
(74) Attorney, Agent, or Firm—Venable LLP; Eric J. Franklin

(57) ABSTRACT

A device and a method for non-contacting sensing of the rotational state of a rotor (10). The rotor has a surface divided into an electrically conductive part (1e) and a nonconductive part (1f). Three electric coils (2a, 2b, 2c) are each included in a respective parallel resonant circuit and are applied close to and with their longitudinal axes oriented towards the rotational path of the electrically conductive part of the rotor. The resonant oscillations are damped depending on the rotational position of the rotor. The rotational state is evaluated with an electronic circuit. In a liquid-flow meter, the coils may be applied in the dry part of the meter.

7 Claims, 3 Drawing Sheets

DEVICE AND A METHOD FOR NON-CONTACTING SENSING OF THE ROTATIONAL STATE OF A ROTOR

TECHNICAL FIELD

The invention relates to a device for non-contacting sensing of the rotational state of a rotor, that is, at least one of the states rotational position, rotational direction, rotational path covered and rotational speed. The rotor has an end surface facing in an axial direction or, alternatively, a part of an envelope surface facing in an axial up to a radial direction, divided around a rotational turn into an electrically conductive part and an electrically non-conductive part, the central angles of these two parts around the axis of rotation of the rotor together comprising 360°. The device comprises three electric coils stationarily fixed adjacent to and with the axes of the coils directed towards the rotational path for the conductive part of the rotor, preferably directed perpendicular to the surface plane of the conductive part of the rotor. These coils are each electrically connected to a capacitor for forming a closed parallel resonant circuit. The resonant circuits of the three coils are connected to a pulse member for starting resonant oscillations as well as to an electronic circuit for evaluation and presentation of the selected data of the rotational state. The device may be used in flow meters for liquids. The invention also relates to a method for sensing the rotational state of a rotor by means of the device.

BACKGROUND ART

It is previously known that the damping in a parallel resonant circuit comprising a coil and a capacitor, a so-called LC oscillating circuit, is influenced by whether the coil is close to an electrically conductive object, or whether two resonant circuits are located close to each other. From German Offenlegungsschrift DE 3318900 A1, a simple electric circuit with an LC circuit is known. A resonant oscillation process in the LC circuit is started with a dc pulse, and it is shown how the oscillation process is damped to a greater extent when an electrically conductive object has been brought close to the coil of the LC circuit.

German Offenlegungsschrift DE 3213602 A1 describes how an electronic apparatus may be designed to derive advantage from the above-mentioned fact. After a resonant oscillation process has been started in the resonant circuit with the aid of a pulse generator, after transformation of the oscillation process up to the point where the oscillation amplitude is lower than a selected threshold value, the apparatus gives rise to square pulses to a counter. The number of square pulses for the respective oscillation process corresponds to the number of half-cycle oscillations with greater amplitude than the threshold value, and this number of square pulses is dependent on whether the resonant circuit has been damped or not through an external influence, for example by a metal object being brought against the coil of the resonant circuit.

It is also previously known to use this principle of sensing for non-contacting sensing of the rotational state in a flow meter for liquids, which has an impeller which rotates with the liquid flow. German patent specification DE 3923398 C1 is based on such a known flow meter, which has a rotor with a section of a surface divided around a rotational turn into surface parts with different electromagnetic properties, that is, with electrically conductive and electrically nonconductive properties, respectively. A number of electric coils included in a corresponding number of LC circuits are arranged adjacent to the rotational path of these rotor surface parts. In these oscillating circuits resonant oscillation processes are started, in a periodic sequence, with the aid of dc pulses emitted to the circuits in a suitable chronological order, whereby the respective resonant oscillation processes are damped to differing degrees, that is, at different speeds, depending on whether the coil of the circuit is currently located adjacent to a rotor surface part with electrically conductive or a rotor surface part with electrically non-conductive properties. The oscillation processes are transformed into different numbers of output square pulses for the LC circuits which are damped to a maximum extent and to a minimum extent, respectively. The square pulses are passed to a counter connected to an evaluation unit, which, from these state signals, calculates the desired data regarding rotation and rotational direction.

According to DE 3923398 C1, it is a common embodiment in these known devices that the conductive and the nonconductive rotary surface parts of the rotor each comprise 180° and that four electric coils are uniformly distributed adjacent to the rotational path of the conductive and the non-conductive surface part of the rotor. With four coils at a mutual distance of 90°, at least one resonant circuit will always be damped to a maximum extent and at least one resonant circuit will always be damped to a minimum extent. From the same specification it is known, as a fundamental condition, that for sensing of the rotational direction, that is, in addition to the sensing of the magnitude of the rotation, a third coil is needed, preferably displaced 90°, in addition to two sensing coils which are displaced 180° in relation to each other. Using a fourth coil, placed at an angle of 90° between the four coils, was considered an advantageous embodiment. In that case, the rotational direction may be sensed also in the event of loss of a coil, for example due to some malfunction.

Thus, the known devices are based on the fact that, depending on whether damping through external influence occurs or not, the oscillation process carries out different numbers of oscillations up to the point where the oscillation amplitude falls below a specified threshold value. However, this number of individual oscillations changes as a result of influence from, for example, the ambient temperature or by the constituent sub-components changing. Under certain circumstances, these changes may be so far-reaching that the number of oscillations, which are carried out by the oscillating circuit in a non-damped state, are so few because of these external circumstances that they are on a level with, or lower than, the number of oscillations which the oscillating circuit originally carried out in a damped state. In spite of attempts to compensate for this situation by means of various evaluation methods and with the location of the coils, the result has not been satisfactory. Among other things, the use of a large number of sensing coils may encroach upon the structural space in very small rotor devices. This applies in particular if, for reasons of space, the rotor has been designed such that it consists of part of the shaft of the device and, in that case, it is desired to have the coils located close to and directed axially to the end surface of the shaft. This surface may be very small in relation to the coils which are then to be accommodated there.

German patent specification DE 4137695 C2 describes a solution to the fact that the shape and the extent of the resonant oscillations are influenced not only by the damping, associated with the sensing of the rotation, but also by other external circumstances such as temperature variations and by the fact that the damping of the oscillations may vary, if the rotor has to be journalled with a radial play, which in this context is not negligible and which may have an unpredictable effect on the distance between the rotor surface and the coils. The described solution has been achieved by the use of a comparison component, which all the time compares the number of oscillations in consecutive resonant oscillations. In that case, it is only necessary to use two sensing coils, displaced 180°, or, in addition thereto, an additional third coil displaced 90°, if also the rotational direction is to be sensed. One problem remains, however, namely, if the coils, displaced 180°, pass the boundary between the electrically conductive and the electrically nonconductive surface parts of the rotor at the very moment when the sensing takes place. In that case, there is no presence of at least one oscillating circuit damped to a maximum extent and at least one oscillating circuit damped to a minimum extent. The evaluation may then become misleading. This applies particularly as it is often necessary to have a clearance in the bearing of the rotor and it is thus necessary to tolerate that the smallest distance between the respective coil and the electrically conductive surface part of the rotor varies during rotation of the rotor.

OBJECT OF THE INVENTION

The object of the invention is to solve the above-mentioned problems during non-contacting sensing of the rotational state of a rotor such that a reliable sensing of the numbers of turns completed, and parts thereof, as well as of the rotational direction may take place also when the oscillation properties of the resonant oscillations of the LC circuits are changed, for example due to influence from the ambient temperature and when the rotor, due to a large operating temperature range, must be journalled such that it is able to move freely a certain distance in the axial direction to permit movements due to temperature expansion to take place without being squeezed.

SUMMARY OF THE INVENTION

The above object is achieved by means of the invention in the form of a device for non-contacting sensing of the rotational state of a rotor of the kind which is described in the introductory paragraph. The device is characterized in that the conductive part and the non-conductive part of the rotor each occupy a central angle within the range of 180°±50°, preferably both 180°, and in that the three coils are placed such that the sum of the two smallest central angles between them exceeds, by at least 10°, the largest of the two central angles which are occupied by the conductive part and by the non-conductive part, respectively, of the rotor, preferably such that the coils are uniformly distributed with all three central angles between them amounting to 120°. In that way, in all the directions of rotation of the rotor, at least one resonant circuit will be damped to a maximum extent and at least one resonant circuit will be damped to a minimum extent. Because of this, the electronic circuit, to which the resonant circuits are to be connected, may provide an improved evaluation by being designed with automatic means for compensating, during the evaluation of the selected data of the rotational state, for variations in the distance between the respective coil and the rotational path of the conductive part of the rotor, that is, for clearance in the bearing of the rotor. The rotor may then be made very small and may even constitute an integral part of the shaft in an apparatus where the shaft and the rotor shall both rotate.

When using the device in a turbine-type flow meter for measuring a liquid flow, preferably with an impeller made rotatable through the influence of the liquid, it may be characterized in that the rotor with its electrically conductive part and its electrically non-conductive part is applied in the wet part of the flow meter, that is, in the liquid, whereas the three coils, which together with three capacitors may form three parallel resonant circuits, as well as these capacitors and associated electric circuits are applied in the dry part of the flow meter with the coils attached to the rotational path of the electrically conductive part of the rotor on the other side of a partition.

The object is also fulfilled with the invention in the form of a method for non-contacting sensing of the rotational state of a rotor by means of the device according to the invention. Thus, the device comprises a section of the rotor which, around a rotational turn, exhibits an electrically conductive and an electrically non-conductive part, and three electric coils applied adjacent to and with the axes of the coils directed towards the rotational path of the electrically conductive part of the rotor. Further, each of the coils are electrically connected to a capacitor for forming a closed parallel resonant circuit which is to be connected to a pulse member for starting resonant oscillations, as well as to an electronic circuit for evaluating selected data in the rotational state of the rotor. This method according to the invention is characterized in that, in dependence on the damping which the electrically conductive part of the rotor is to achieve depending on the rotational position of the rotor, an electrical resonant oscillation, with differing rates of decay, is started in each of the resonant circuits with a dc pulse in one resonant circuit at a time, that is, with sequential starting of the resonant oscillations of the circuits, and in that these oscillations in this order are sensed and evaluated with the electronic circuit for presentation or further data use of the selected data of the rotational state. Hence, the sensing of the resonant oscillations is performed with no significant mutual influence between the three circuits on the coil and the capacitor.

In a preferred embodiment, the method is characterized in that the electric circuit for each one of the pairs of coil and capacitor is closed into a functioning parallel resonant circuit only when a resonant oscillation is to be started in the circuit, whereupon that parallel resonant circuit is broken again at the latest when the next parallel resonant circuit is closed and a resonant oscillation is started therein. In that way, the coils of the three parallel resonant circuits influence one another to a minimum extent and may be mounted closely together for sensing of the rotation of small rotors.

Another preferred embodiment of the method is characterized in that the coil and the capacitor in each one of the three circuits, prior to closing the circuit into a parallel resonant circuit and starting the resonant oscillation with the aid of a dc pulse, are held connected to each other in a series connection and jointly to a dc source, for example with the capacitor connected to the dc source and the coil to ground (a reference voltage), and with a connection to the electronic circuit for sensing the resonant oscillation placed between the coil and the capacitor, and that the start of the respective resonant oscillation takes place by closing a short-circuit conductor past the capacitor and the coil. In that way, no control of the extension in time of the dc pulse is needed.

BRIEF DESCRIPTION OF THE DRAWINGS

The invention will be described in greater detail in the following description with reference to the accompanying drawing, wherein FIG. 1 schematically shows coils for three LC circuits applied for axial rotational sensing adjacent to the end surface of a shaft or adjacent to the end surface of a rotor mounted on a shaft, FIG. 2 schematically shows coils for three LC circuits applied for radial rotational sensing adjacent to the envelope surface of a shaft or adjacent to the envelope surface of a rotor mounted on a shaft.

DESCRIPTION OF THE PREFERRED EMBODIMENTS

Figure 1:
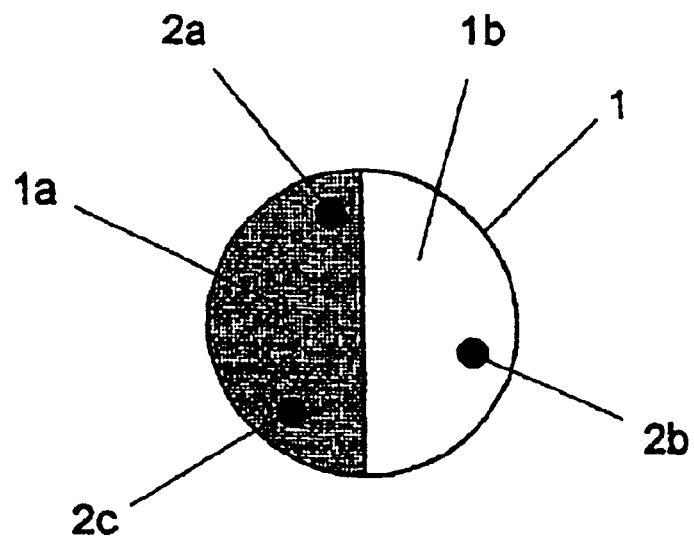

FIG. 1 schematically shows an end view of a rotor 1 for a device for non-contacting sensing of the rotational state of the rotor. The rotor may also be an end part of a shaft. Three electric coils 2a, 2b and 2c are applied close to the end surface of the rotor, in the embodiment shown with their longitudinal axes oriented parallel to the longitudinal axis of the rotor shaft for axial rotational sensing. To enable sensing of the rotation of the rotor according to the invention, the end surface of the rotor is divided into an electrically conductive part 1a and an electrically non-conductive part 1b. In the preferred embodiment shown, the two parts each comprise 180° of the end surface of the rotor. The three electric coils 2a, 2b and 2c are stationarily attached close to, and with their axes directed towards, the rotational path of the conductive part of the end surface of the rotor, preferably perpendicular to its surface plane.

Figure 2:
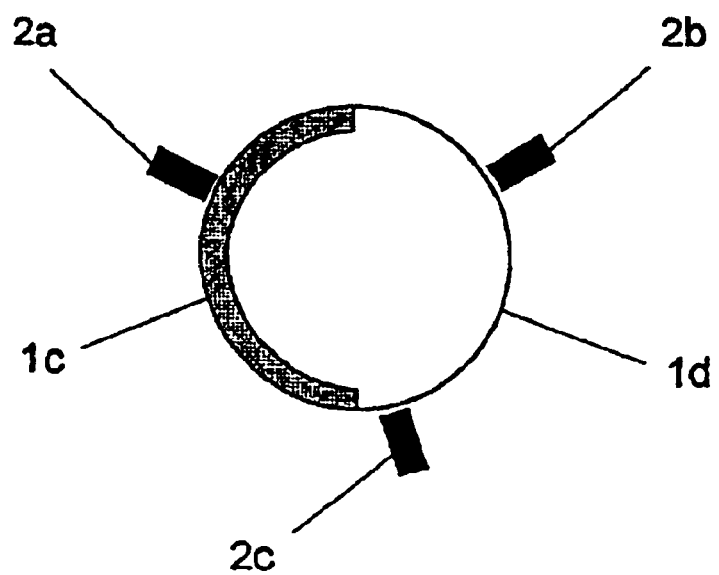

FIG. 2 schematically shows how the three electric coils 2a, 2b and 2c may instead be applied close to the envelope surface of the rotor along a longitudinal section of the envelope surface, which is divided around a rotational turn into an electrically conductive part 1c and an electrically non-conductive part 1d. The rotor may then also consist of a longitudinal section of a shaft. In the embodiment shown, the three coils are arranged with their longitudinal axes oriented radially outwards from the envelope surface of the rotor to perform a radial rotational sensing. They are stationarily attached close to, and with their axes directed towards, the rotational path of the conductive part of this section of the envelope surface of the rotor, preferably perpendicular to the surface plane of that part upon its passage past the respective coil.

Figure 3:
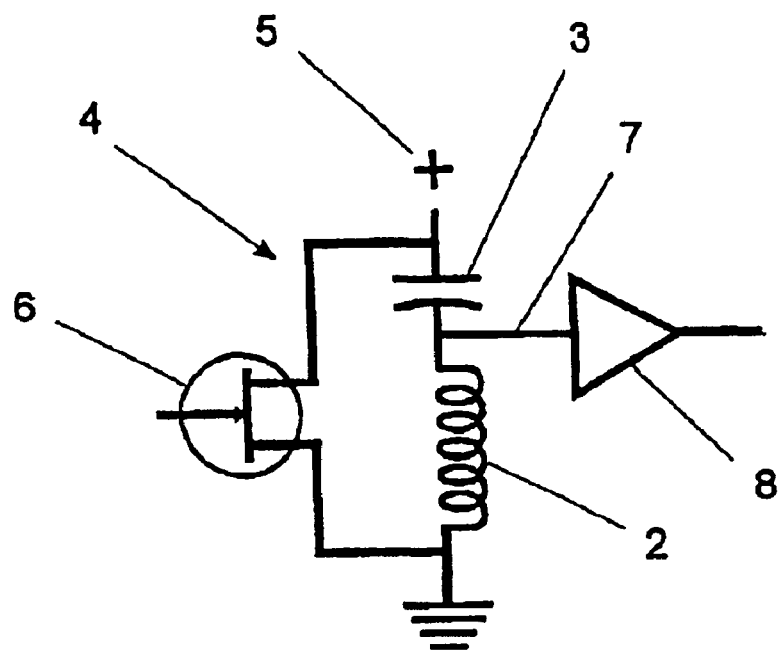
FIG. 3 shows an elementary circuit diagram of an LC oscillating circuit with a coil and a capacitor and with a circuit breaker for opening and closing the resonant circuit as well as for generating a pulse upon closing of the circuit for starting a resonant oscillation in the circuit, it being shown how connection may be made to an electronic circuit for sensing and evaluating the oscillations and thereby the rotation of the rotor.

In FIG. 3, an elementary circuit diagram shows how each of the three electric coils 2, i.e. 2a, 2b and 2c, is connected to a capacitor 3 in such a way as to form a parallel resonant circuit 4, if the connection through the coil and the capacitor is extended into a closed circuit. The respective coil 2 is thus connected to ground (a reference voltage) and the capacitor 3 is connected, on its side facing away from the coil, to a dc source 5. An electric circuit breaker 6 may be controlled to break and close an electric connection, with a frequency adapted to the field of use, past the capacitor and the coil. When it closes that connection, it also closes the circuit through the coil and the capacitor to a resonant circuit while at the same time generating an electric pulse in the resonant circuit by short-circuiting the potential from the dc source 5. This pulse generation starts a resonant oscillation, which is damped to varying degrees, that is, at varying speeds, in dependence on different damping conditions in the circuit itself and also, to a large extent, from its surroundings. Since that part of the rotor, towards which the coils are directed, is divided into an electrically conductive part 1a, 1c and an electrically non-conductive part 1b, 1d, which during rotation of the rotor alternately passes past and close to the respective coil, different damping of the respective resonant circuit occurs in dependence on the rotational position of the rotor. This makes possible an accurate sensing of the rotation of the rotor. The resonant oscillations in the respective resonant circuit are sensed, in the embodiment shown, with a connection 7 between the coil 2 and the capacitor 3. The connection may be provided with electronic adaptation equipment 8 and is connected, for evaluation, to an electronic circuit (not shown) which is able to present the selected data of the rotational state.

Such an electronic circuit may be designed in a known way, on the basis of the oscillation values obtained from the resonant circuits of the sensing device relating primarily to the extension in time of the oscillations at varying damping when the rotor is rotating, to calculate and present all of the sub-components of the rotational state which are desirable to present, above all rotational position, rotational direction, rotational path covered, and rotational speed. Since the aim is to design modern measuring equipment, in this case primarily flow meters, as efficiently and at the same time as small as possible, there will be little room for the sensing device in these small devices. One condition for the invention is therefore that only three electric coils are to be used, which is the smallest number of coils which allows measurement of both the rotational path and the rotational direction, and to allow these three coils to be influenced by only one electrically conductive and one electrically non-conductive section of a surface on the rotor in order for their varying damping effect to clearly manifest itself also in the case of small rotor dimensions.

One difficulty when using only three coils and two sections of a surface on the rotor in the sensing device is, however, that, in addition to the effect of, for example, temperature variations and of a necessary axial clearance in the rotor bearing, which factors may per se disturb but according to the prior art do not prevent the electronic circuit from evaluating the rotational state, there is also the purely geometrical situation that, with this small number of coils, sometimes during the rotation either all the three coils arrive within the same section of a surface on the rotor, or two of the coils arrive straight above the two boundary lines between the electrically conductive part of the rotor and the electrically non-conductive part of the rotor. Therefore, from time to time during the rotation of the rotor, there is no presence of at least one resonant circuit which is damped to a maximum extent and at the same time at least one resonant circuit which is damped to a minimum extent. These sensing instants then render the evaluation work of the electronic circuit impossible or so difficult that values are obtained which are not entirely reliable, for example in case of small rotational movements back and forth of the rotor. This occurs when two sensing coils are placed diagonally opposite to each other, according to the prior art, that is, at an angle of 180° between them, and with a third sensing coil placed somewhere in between, for example at a distance of 90° to, that is, midway between, the other two coils, if at the same time there are a 180° conductive and a 180° non-conductive rotor surface for the sensing.

To eliminate this risk of extra, and in practice decisive, disturbance of the sensing, the invention suggests an embodiment in which the conductive part and the non-conductive part of the rotor each occupy a central angle within the range of 180°±50°, preferably both 180°, that the three coils are so placed that the sum of the two smallest central angles between them exceeds, by at least 10°, the largest of the two central angles which are occupied by the conductive part and the non-conductive part of the rotor, respectively, the coils being preferably uniformly distributed with all three central angles between them amounting to 120°. In this way, in all rotational positions of the rotor, at least one resonant circuit will be damped to a maximum extent and at least one resonant circuit will be damped to a minimum extent. The electronic circuit may then be designed to show correct values for all the parts of the rotational state in spite of the other disturbances mentioned.

In FIG. 1 and FIG. 2 of the drawing, the most preferred embodiment of the invention, according to the above, has been chosen, that is, with an angle of successively 120° between the three coils and with the two sections of the surface of the rotor, prepared for the sensing process, each extending 180° around the rotor. In that case, two coils cannot simultaneously arrive straight above, or even at small dimensions close to, the two boundaries between the sections of the surface. Instead, the oscillations in at least one coil will always be damped to a maximum extent while at the same time the oscillations in at least one of the other coils are damped to a minimum extent.

Figure 4:
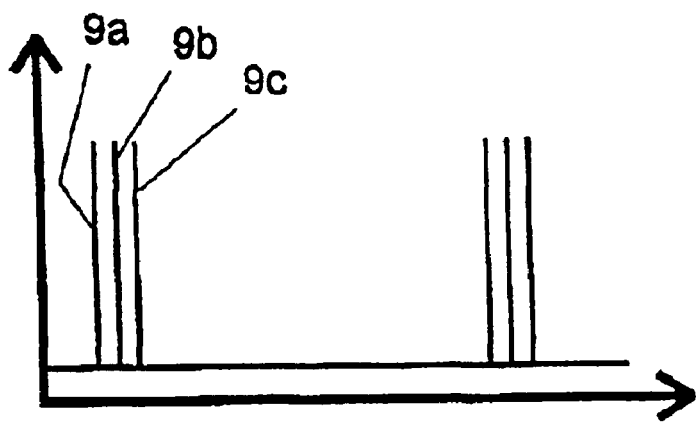
FIG. 4 shows a time diagram of the sensing sequence.

The sensing may also be disturbed by the fact that the resonant circuits in themselves, as well as their mutual resonant oscillations, influence each other, that is, the damping in each of the circuits is disturbed. In a method according to the invention, the oscillations are therefore started in one resonant circuit at a time, that is, the resonant oscillations of the circuits are started in sequence. These oscillations are then sensed in this sequential order and are evaluated with the electronic circuit for presentation, or further data use, of the selected data of the rotational state. FIG. 4 shows how the pulses 9a, 9b and 9c for starting the oscillations in the three resonant circuits may be distributed in sequence over time.

To also prevent the resonant circuits as such from influencing each other, it is possible according to the invention to ensure that each resonant circuit is held closed only for that period during which an oscillation is to take place therein, whereas that circuit is broken for the rest of the time so as not to constitute a closed resonant circuit. The coils of the three parallel resonant circuits will then influence each other only to a minimum extent and they can also be mounted closely together for sensing the rotation of small rotors.

One way of achieving this is applied with the connection according to FIG. 3, where the circuit breaker 6 breaks and closes the resonant circuit and, upon each closure, simultaneously brings about an electric pulse which starts a resonant oscillation. Nor is any control of the extension in time of the dc pulse needed with this embodiment.

Figure 5:
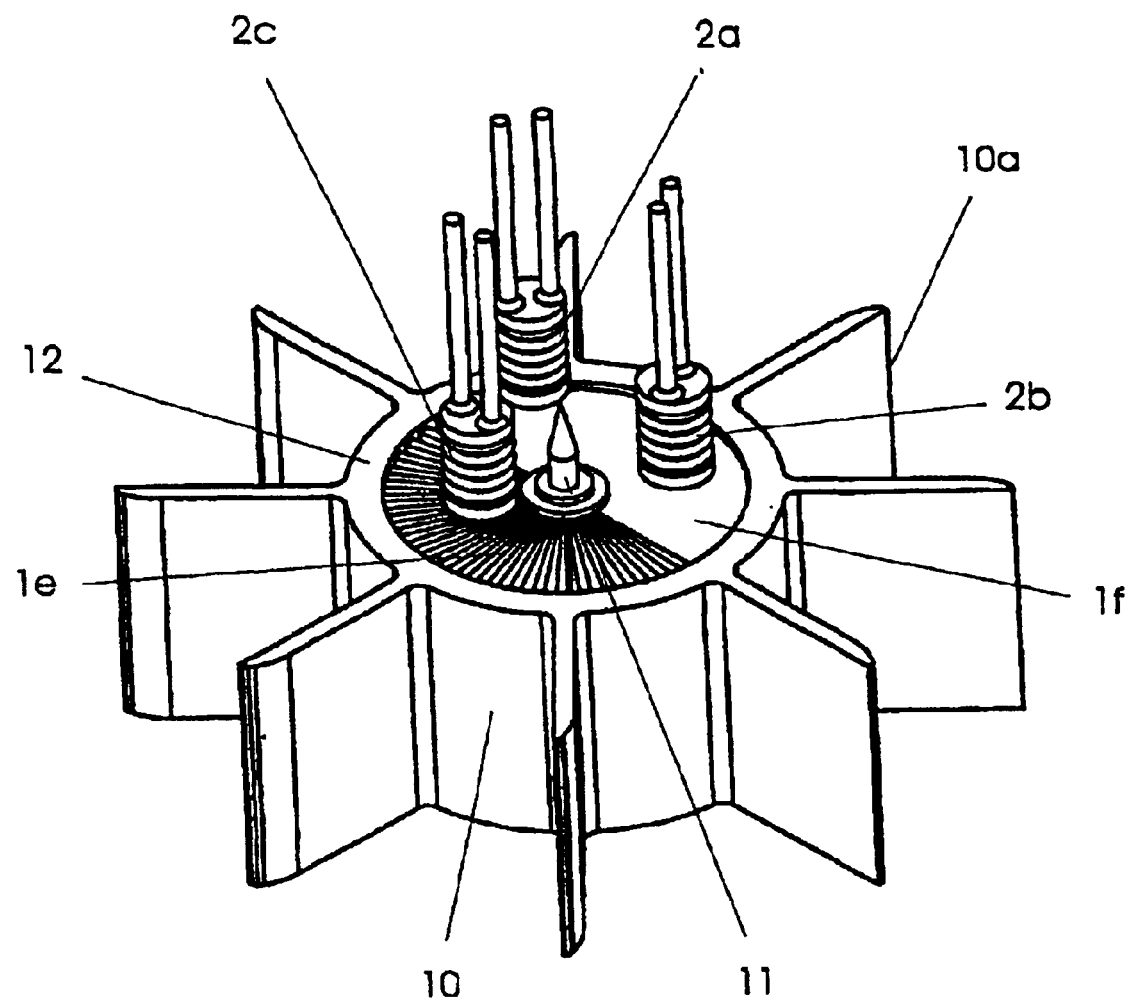
FIG. 5 shows an example of use of the invention in a liquid-flow meter.

FIG. 5 shows how the sensing may be arranged in a liquid-flow meter with an impeller. The impeller 10, which in the embodiment shown is the rotor of the sensing device, is applied in the wet part of the flow meter, that is, in the liquid, whereas the three electric coils 2a, 2b and 2c, which are part of the sensing device, are applied in the dry part of the flow meter. Between the coils and the impeller there is a partition (not shown) or other insulation around the coils, which prevents the liquid around the impeller from entering into the space where the respective coil is arranged. One of the central side parts of the impeller has the shape of a circular plane surface, which on one semicircular segment 1e is metallized and on its other semicircular segment 1f is not electrically conductive. This half-side metallized, circular surface may also instead be an end surface of a rotating shaft or shaft part, to which the impeller, in that case only consisting of a rim 12 and blades 10a, is then attached. The impeller is designed to rotate around and together with a shaft part 11, which is journalled in such a way that the friction during the rotation is low. The impeller may instead be journalled to rotate around a stationary shaft, and its bearing may be designed with low friction also in this case.

In FIG. 5, the three coils 2a, 2b and 2c are applied close to the half-side metallized circular surface, which rotates with the impeller, but on the other side of the partition (not shown). The coils are applied with their longitudinal axes oriented perpendicular to the half-side metallized circular surface. They are placed at a mutual angular distance of 120° in order to be able to provide the best possible sensing values from the parallel resonant circuits connected to the respective coil and the associated capacitor, taking into consideration any type of disturbance which may occur. The sensing values are passed to an electronic circuit (not shown), designed for such purposes and known per se, which circuit is designed to calculate and present or further use selected data which are included in the rotational state of the impeller.

Alternative Embodiments

Different detail embodiments of the sensing device and of the method for use thereof may, of course, be varied in different ways without departing from the invention as described in claims 1 and 4. For example, the electrically conductive and the electrically non-conductive rotary parts, respectively, of the rotor may be arranged at another place than at an axially facing end surface or on a radially facing envelope surface of a rotating member. They may, for example, instead be applied to a rotating part with a conical or curved shape. The longitudinal axes of the coils need not be oriented completely perpendicularly to the surface, for example in such cases where the coils in the sensing equipment are more easily placed if this is avoided. The generation of pulses to the parallel resonant circuits for starting the resonant oscillations may also be performed with some other device than the circuit breaker described.

What is claimed is:

1. A device for non-contacting sensing of the rotational state of a rotor, that is, at least one of the states rotational position, rotational direction, rotational path covered, and rotational speed, wherein the rotor (1, 10) has an end surface (1a+1b) (1e+1f) facing in an axial direction or, alternatively, a part of an envelope surface (1c+1d) facing in an axial up to a radial direction, divided around a rotational turn into an electrically conductive part (1a, 1c, 1e) and an electrically non-conductive part (1b, 1d, 1f), the central angles of said two parts around the axis of rotation of the rotor together comprising 360°, and wherein the device comprises three electric coils (2a, 2b, 2c) stationarily attached close to and with the axes of the coils directed towards the rotational path of the conductive part of the rotor, preferably directed perpendicular to the surface plane of the conductive part of the rotor, which coils (2) are each electrically connected to a capacitor (3) for forming a closed parallel resonant circuit 4, where the resonant circuits of the three coils are connected to a pulse member for starting resonant oscillations as well as to an electronic circuit which may evaluate and present the selected data of the rotational state, and wherein further the conductive part and the non-conductive part of the rotor each occupy a central angle within the range 180°±50°, preferably both 180°, and the three coils are so placed that the sum of the two smallest central angles between them exceeds, by at least 10°, the largest of the two central angles which are occupied by the conductive and non-conductive parts of the rotor, respectively, the coils being preferably uniformly distributed with all three central angles between them amounting to 120°, whereby, in all the rotational positions of the rotor, at least one resonant circuit is damped to a maximum extent and at least one resonant circuit is damped to a minimum extent, characterized in that the electric circuit for each of the pairs of coil (2) and capacitor (3), which shall form each of the parallel resonant circuits (4), in its non-working condition, when no resonant oscillations are to take place in it, is configured as an open circuit, and that it comprises a means (6), which is constructed to close the circuit into a functioning closed parallel resonant circuit, when a resonant oscillation is to be started in this circuit, and to break this circuit again into an open circuit, when resonant oscillations shall no longer take place in this circuit, wherein each of the resonant circuits (4) provides measurements used in calculations to compensate for variations in the distance between the respective coil (2) and the rotational path of the conductive part of the rotor (1c) for clearance in the bearing of the rotor.

2. A device according to claim 1, characterized in that the coil (2) and the capacitor (3) in each of the parallel resonant circuits (4) are connected to each other in series between a dc source (5) and a reference voltage, and that a short-circuit conductor, which comprises the closing and breaking means (6), is connected across the coil and the capacitor, and that thereby this means (6), at the same time as it closes the circuit into a functioning closed parallel resonant circuit, also is arranged to bring about a short-circuiting impulse, which will start the resonant oscillation in this circuit.

3. A device according to claim 1, in an apparatus which comprises a shaft (1) which is designed to rotate, characterized in that the rotor constitutes an integral part of the shaft.

4. A device according to claim 1 for use in a turbine-type flow meter for measuring a liquid flow, preferably with an impeller (10) made rotatable through the influence of the liquid, characterized in at the rotor (10, 1e, 1f) with its electrically conductive part (1c) and its electrically non-conductive part (1f) is applied in the wet part of the flow meter, that is, in the liquid, whereas the three coils (2a, 2b, 2c), which together with three capacitors (3) may form three parallel resonant circuits (4), as well as these capacitors and associated electric circuits are applied in the dry part of the flow meter with he coils attached close to the rotational path of the electrically conductive part (1e) of the rotor on the other side of a partition.

5. A method for non-contacting sensing of the rotational state of a rotor (1, 10) by means of a device according to claim 1, which comprises a section of the rotor around a rotational turn which exhibits an electrically conductive part (1a, 1c, 1e) and an electrically non-conductive part (1b, 1d, 1f), as well as three electric coils (2a, 2b, 2c) applied close to and with the axes of the coils directed towards the rotational path of the electrically conductive part of the rotor, each of the coils being electrically connected to a capacitor (3) for forming a closed parallel resonant circuit (4) through the coil and the capacitor and for connection to an electronic circuit for evaluating selected data in the rotational state of the rotor, characterized in that, in dependence on the damping which the electrically conductive part of the rotor is to achieve in dependence on the rotational position of the rotor, an electrical resonant oscillation, with varying speeds of decay depending thereon, is started in each of the three resonant circuits with a dc pulse (9a, 9b, 9c) in one resonant circuit at a time, that is, the resonant oscillations of the circuits are started in sequence, and that these oscillations in is order are sensed and evaluated with the electronic circuit for presentation, or further data use, of the selected data of the rotational state, whereby the sensing of the resonant oscillations takes place without any significant mutual influence between the three circuits on the coil and the capacitor.

6. A method according to claim 5, characterized in that the electric circuit for each of the pairs of coil (2) and capacitor (3) is closed into a functioning parallel resonant circuit (4) only when a resonant oscillation is to be started in the circuit, whereupon that parallel resonant circuit is broken again at the latest when the next parallel resonant circuit is closed and a resonant oscillation is started therein, whereby the coils of the three parallel resonant circuits influence one another to a minimum extent and may be mounted closely together for sensing the rotation of small rotors.

7. A method according to claim 6, characterized in that the coil (2) and the capacitor (3) in each of the three circuits, prior to closing the circuit into a parallel resonant circuit (4) and starting a resonant oscillation with the aid of a dc pulse (9a, 9b, 9c), are held connected to each other in a series connection and jointly to a dc source (5), with the capacitor connected to the dc source and the coil to a reference voltage, and with a connection (7) to the electronic circuit for sensing the resonant circuit placed between the coil and the capacitor, and that the start of the respective resonant oscillation takes place by closing a short-circuit conductor (6) across the capacitor and the coil, whereby no control of the extension in time of the dc pulse is required.

* * * * *